(12) United States Patent
Park et al.

(10) Patent No.: US 12,323,723 B2
(45) Date of Patent: Jun. 3, 2025

(54) IMAGE SENSING DEVICE AND IMAGING DEVICE INCLUDING THE SAME

(71) Applicant: SK hynix Inc., Icheon-si Gyeonggi-do (KR)

(72) Inventors: Da Hwan Park, Icheon-si (KR); Min Kyu Kim, Icheon-si (KR); Hak Soon Kim, Icheon-si (KR); Min Seok Shin, Icheon-si (KR); Yong Seop Lee, Icheon-si (KR); Eun Chang Lee, Icheon-si (KR); Hoo Chan Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/429,783

(22) Filed: Feb. 1, 2024

(65) Prior Publication Data

US 2024/0430593 A1    Dec. 26, 2024

(30) Foreign Application Priority Data

Jun. 22, 2023 (KR) .......................... 10-2023-0080662

(51) Int. Cl.
*H04N 25/773* (2023.01)
*H04N 25/76* (2023.01)

(52) U.S. Cl.
CPC ....... *H04N 25/773* (2023.01); *H04N 25/7795* (2023.01)

(58) Field of Classification Search
CPC ............ H04N 25/773; H04N 25/7795; H04N 25/705; H04N 25/771; G01S 7/4863; G01S 7/4865; G01S 17/894
See application file for complete search history.

(56) References Cited

U.S. PATENT DOCUMENTS

| 11,476,372 | B1  | 10/2022 | Mandai et al. |
| 2018/0164415 | A1* | 6/2018 | Buckley ................. G01S 17/18 |
| 2020/0174105 | A1* | 6/2020 | Yin ........................ G01S 7/4914 |
| 2021/0044299 | A1* | 2/2021 | Tertinek .................. H03L 7/091 |
| 2022/0221562 | A1* | 7/2022 | Wang ..................... H04N 25/00 |
| 2023/0094219 | A1* | 3/2023 | Takatsuka ............ H04N 25/773 |
| | | | 257/292 |

FOREIGN PATENT DOCUMENTS

KR    1020190093611 A    8/2019

* cited by examiner

*Primary Examiner* — Thanh Luu
*Assistant Examiner* — Mai Thi Ngoc Tran
(74) *Attorney, Agent, or Firm* — WILLIAM PARK & ASSOCIATES LTD.

(57) ABSTRACT

An image sensing device includes a pixel configured to generate a pixel signal having a single photon avalanche diode (SPAD) pulse by detecting incident light, a time-to-digital converter (TDC) configured to generate time-to-digital converter (TDC) data representing a time of flight (TOF) for the SPAD pulse, and a TDC memory configured to store the TDC data in a unit memory that is determined from among a plurality of unit memories according to the number of occurrences of the SPAD pulse.

14 Claims, 7 Drawing Sheets

IMAGE SENSING DEVICE AND IMAGING DEVICE INCLUDING THE SAME

CROSS-REFERENCE TO RELATED APPLICATION

The present application claims the priority and benefits of Korean patent application No. 10-2023-0080662, filed on Jun. 22, 2023, in the Korean Intellectual Property Office, the disclosure of which is incorporated herein by reference in its entirety as part of the disclosure of this patent document.

TECHNICAL FIELD

The present technology and embodiments generally relate to an image sensing device capable of detecting a distance to a target object and an imaging device including the same.

BACKGROUND

An image sensing device is a device for capturing optical images by converting light into electrical signals using a photosensitive semiconductor material which reacts to light. With the development of automotive, medical, computer and communication industries, the demand for high-performance image sensing devices is increasing in various devices such as smart phones, digital cameras, game machines, IoT (Internet of Things), robots, security cameras and medical micro-cameras.

Recently, the image sensing devices are actively used not only to obtain color images but also to sense the distance to a target object. In particular, among a variety of image sensing devices, an image sensing device based on a time of flight (ToF) method capable of directly or indirectly measuring the time required for irradiated light to reflect from an object and return to the image sensor has been widely used.

SUMMARY

In accordance with an embodiment of the disclosed technology, an image sensing device may include a pixel configured to generate a pixel signal having a single photon avalanche diode (SPAD) pulse by detecting incident light; a time-to-digital converter (TDC) configured to generate time-to-digital converter (TDC) data representing a time of flight (TOF) for the SPAD pulse; and a TDC memory configured to store the TDC data in a unit memory that is determined from among a plurality of unit memories according to the number of occurrences of the SPAD pulse.

In accordance with another embodiment of the disclosed technology, an image sensing device may include a memory block provided with a plurality of unit memories; and a memory control block configured to control the memory block to store time-to-digital converter (TDC) data representing a time of flight (TOF) for a single photon avalanche diode (SPAD) pulse, the SPAD pulse being stored in a unit memory that is determined from among a plurality of unit memories according to the number of occurrences of the SPAD pulse generated through detection of incident light.

In accordance with another embodiment of the disclosed technology, an imaging device may include an image sensing device configured to store time-to-digital converter (TDC) data representing a time of flight (TOF) for a single photon avalanche diode (SPAD) pulse, the SPAD pulse being stored in a unit memory that is determined from among a plurality of unit memories according to the number of occurrences of the SPAD pulse generated through detection of incident light; and an image signal processor configured to calculate a distance between a pixel generating the SPAD pulse and a target object based on the TDC data.

BRIEF DESCRIPTION OF THE DRAWINGS

The above and other features and beneficial aspects of the disclosed technology will become readily apparent with reference to the following detailed description when considered in conjunction with the accompanying drawings.

DETAILED DESCRIPTION

The present application provides embodiments and examples of an image sensing device capable of detecting a distance to a target object and an imaging device including the same that may be used in configurations to substantially address one or more technical or engineering issues and to mitigate limitations or disadvantages encountered in some other image sensing devices. Some embodiments of the disclosed technology relate to an image sensing device capable of reducing unnecessary power consumption and an imaging device including the same. The disclosed technology provides various embodiments of thee image sensing device and the imaging device including the same can reduce a peak current by minimizing the number of unit memories configured to operate when time-to-digital converter (TDC) data corresponding to a single photon avalanche diode (SPAD) pulse is stored.

Reference will now be made in detail to the embodiments of the disclosed technology, examples of which are illustrated in the accompanying drawings. Wherever possible, the same reference numbers will be used throughout the drawings to refer to the same or like parts. While the disclosure is susceptible to various modifications and alternative forms, specific embodiments thereof are shown by way of example in the drawings. However, the disclosure should not be construed as being limited to the embodiments set forth herein.

Hereafter, various embodiments will be described with reference to the accompanying drawings. However, it should be understood that the disclosed technology is not limited to specific embodiments, but includes various modifications, equivalents and/or alternatives of the embodiments. The embodiments of the disclosed technology may provide a variety of effects capable of being directly or indirectly recognized through the disclosed technology.

Various embodiments of the disclosed technology relate to an image sensing device capable of reducing unnecessary power consumption and an imaging device including the same.

It is to be understood that both the foregoing general description and the following detailed description of the disclosed technology are illustrative and explanatory and are intended to provide further explanation of the disclosure as claimed.

Figure 1:
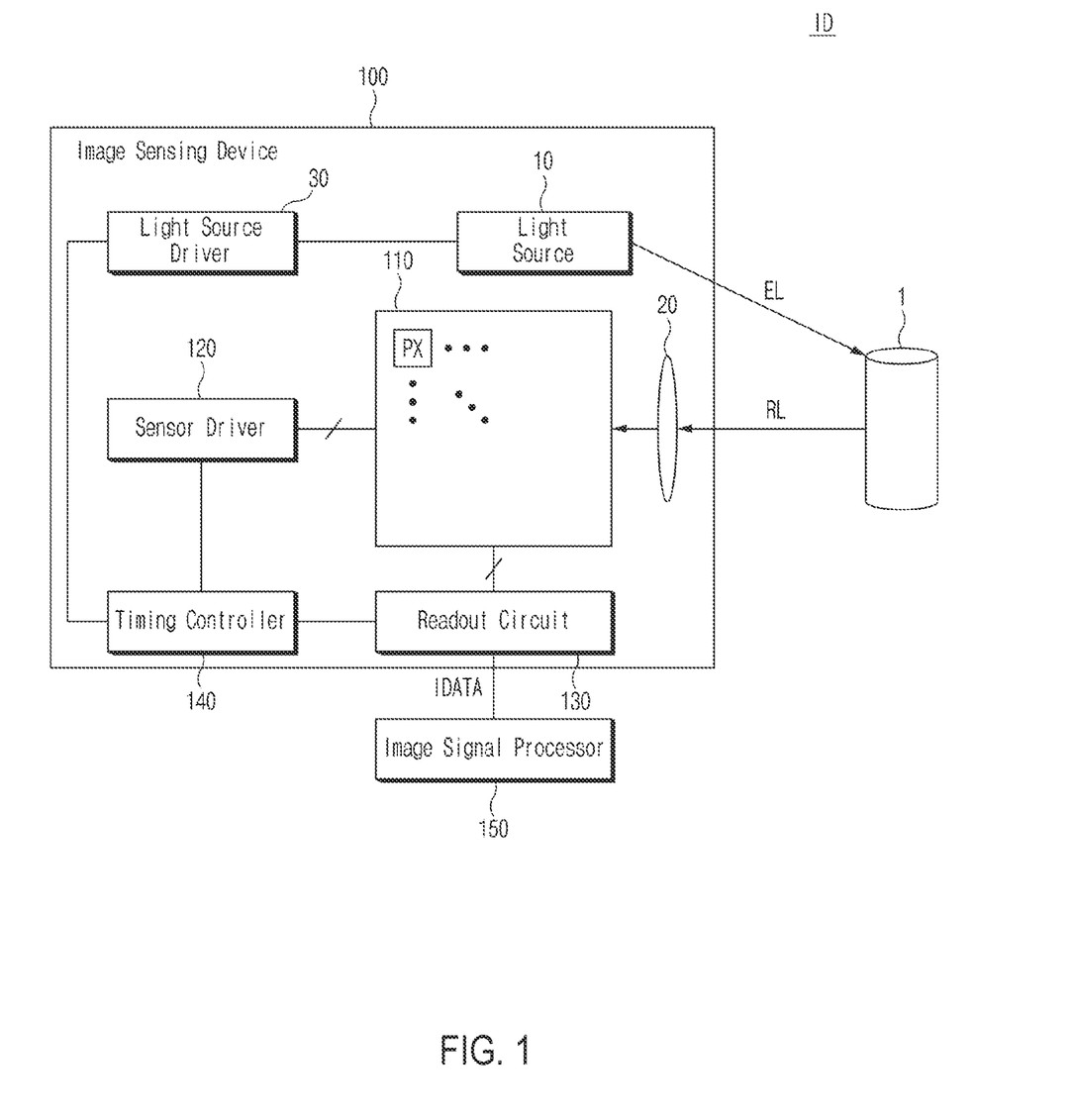
FIG. 1 is a block diagram illustrating an example of an imaging device based on some embodiments of the disclosed technology.

FIG. 1 is a block diagram illustrating an example of an imaging device (ID) based on some embodiments of the disclosed technology.

Referring to FIG. 1, the imaging device (ID) may refer to a device, for example, a digital still camera for photographing still images or a digital video camera for photographing moving images. For example, the imaging device (ID) may be implemented as a Digital Single Lens Reflex (DSLR) camera, a mirrorless camera, or a smartphone, and others. The imaging device (ID) may include a device having both a lens and an image pickup element such that the device can capture (or photograph) a target object and can thus create an image of the target object. In some implementations, the imaging device (ID) may be implemented as a Lidar sensor.

The imaging device (ID) may include an image sensing device 100 and an image signal processor (ISP) 150.

The image sensing device 100 may be a complementary metal oxide semiconductor image sensor (CIS) for converting an incident light into an electrical signal. The image sensing device 100 may include a light source 10, a lens module 20, a light source driver 30, a pixel array 110, a sensor driver 120, a readout circuit 130, and a timing controller 140.

The light source 10 may emit light to a target object 1 upon receiving a control signal from the light source driver 30. The light source 10 may be a laser diode (LD) or a light emitting diode (LED) for emitting light (e.g., near infrared (NIR) light, infrared (IR) light or visible light) having a specific wavelength band or may be any one of a Near Infrared Laser (NIR), a point light source, a monochromatic light source combined with a white lamp or a monochromator, and a combination of other laser sources. For example, the light source 10 may emit infrared light having a wavelength of 800 nm to 1000 nm. Meanwhile, light emitted from the light source 10 may be pulsed light having a predetermined period, amplitude, and pulse width. Although FIG. 1 shows only one light source 10 for convenience of description, the scope or spirit of the disclosed technology is not limited thereto, and a plurality of light sources may also be arranged in the vicinity of the lens module 20.

The lens module 20 may collect light reflected from the target object 1 and may allow the collected light to be focused onto pixels (PXs) of the pixel array 110. For example, the lens module 20 may include a focusing lens having a surface formed of glass or plastic or another cylindrical optical element having a surface formed of glass or plastic. The lens module 20 may include a plurality of lenses that is arranged to be focused upon an optical axis.

The light source driver 30 may drive the light source 10 under the control of the timing controller 140. In particular, the light source driver 30 may control waveforms (e.g., a period, amplitude, pulse width, etc.) of emitted light (EL) output from the light source 10.

The pixel array 110 may include a plurality of pixels (PXs) consecutively arranged in a two-dimensional (2D) matrix structure (e.g., consecutively arranged in a column direction and/or a row direction). Each of the plurality of pixels (PXs) may generate a pixel signal by sensing incident light that is sensed through the lens module 20 under the control of the sensor driver 120.

Each pixel (PX) may be an infrared pixel for generating a pixel signal by sensing incident light that includes reflected light (RL) generated when emitted light (EL) from the light source 10 is reflected from the target object 1. The incident light may be light incident to the pixel array 110 through the lens module 20. According to an embodiment, the infrared pixel may be a depth pixel for calculating the distance to the target object 1. According to another embodiment, the infrared pixel may include a pixel for generating an infrared image by simply sensing reflected infrared light sensed from a scene without sensing reflected visible light. According to still another embodiment, the pixels (PXs) may include a pixel for generating a color image by sensing reflected visible light sensed from a scene. Hereinafter, it will be described assuming that each pixel (PX) is a single photon avalanche diode (SPAD) pixel for detecting the distance to the target object 1 according to a direct time-of-flight (ToF) method. A more detailed structure and operations of each unit pixel (PX) will hereinafter be described with reference to the drawings from FIG. 2.

The sensor driver 120 may drive the pixels (PXs) of the pixel array 110 in response to a timing signal output from the timing controller 140. For example, the sensor driver 120 may generate a control signal capable of selecting and controlling pixels (PXs) included in at least one row line from among a plurality of row lines of the pixel array 110.

The readout circuit 130 may process pixel signals received from the pixel array 110 under the control of the timing controller 140 and may generate and store depth data for detecting the distance to the target object 1. Specifically, the readout circuit 130 may calculate a candidate time-of-flight (TOF) corresponding to SPAD pulses generated by each pixel (PX) sensing the incident light including reflected light and may store the candidate time-of-flight (TOF) corresponding to the SPAD pulses in units of a subframe. The readout circuit 130 may transmit the candidate time-of-flight (TOF) stored in units of a subframe to the image signal processor 150 under control of the timing controller 140. In some implementations, for convenience of description, the candidate time-of-flight (TOF) may be used interchangeably with a flight time as needed.

The timing controller 140 may generate a timing signal to control the light source driver 30, the sensor driver 120, and the readout circuit 44. In some implementations, the timing controller 140 may generate a timing signal according to either data received from the readout circuit 130 or a request received from the image signal processor 150. In some implementations, the timing controller 140 may include a logic control circuit, a phase lock loop (PLL) circuit, a timing control circuit, a communication interface circuit, and others.

The image signal processor 150 may perform at least one image signal process on image data (IDATA) received from the image sensing device 100 and may thus generate the processed image data. The image signal processor 150 may reduce noise of image data (IDATA) and may perform various kinds of image signal processing (e.g., interpolation of image data (IDATA), lens distortion correction, etc.) for image-quality improvement of the image data.

The image data (IDATA) may include the candidate time-of-flight (TOF) stored for each subframe. The image signal processor 150 may generate a histogram for one frame by accumulating data stored in units of a subframe and may determine a target time-of-flight (TOF) for one frame based on the histogram. The target time-of-flight (TOF) may be determined for each pixel (PX), and the image signal processor 150 may determine a target distance (i.e., the distance to the target object 1 detected by each pixel PX) based on the target time-of-flight (TOF) of each pixel (PX). A set (or aggregate) of target distances for the pixels (PXs) included in the pixel array 110 may be referred to as a depth image and may be included in processed image data.

The image signal processor 150 may transmit the processed image data to a host device (not shown). The host device (not shown) may be a processor (e.g., an application processor) for processing image signal processed (ISP) image data received from the image signal processor 150, a memory (e.g., a non-volatile memory) for storing the ISP image data, or a display device (e.g., a liquid crystal display (LCD)) for visually displaying the ISP image data.

The image signal processor 150 may transmit a control signal for controlling operations (whether or not to operate, an operation timing, an operation mode, etc.) of the image sensing device 100 to the image sensing device 100.

Figure 2:
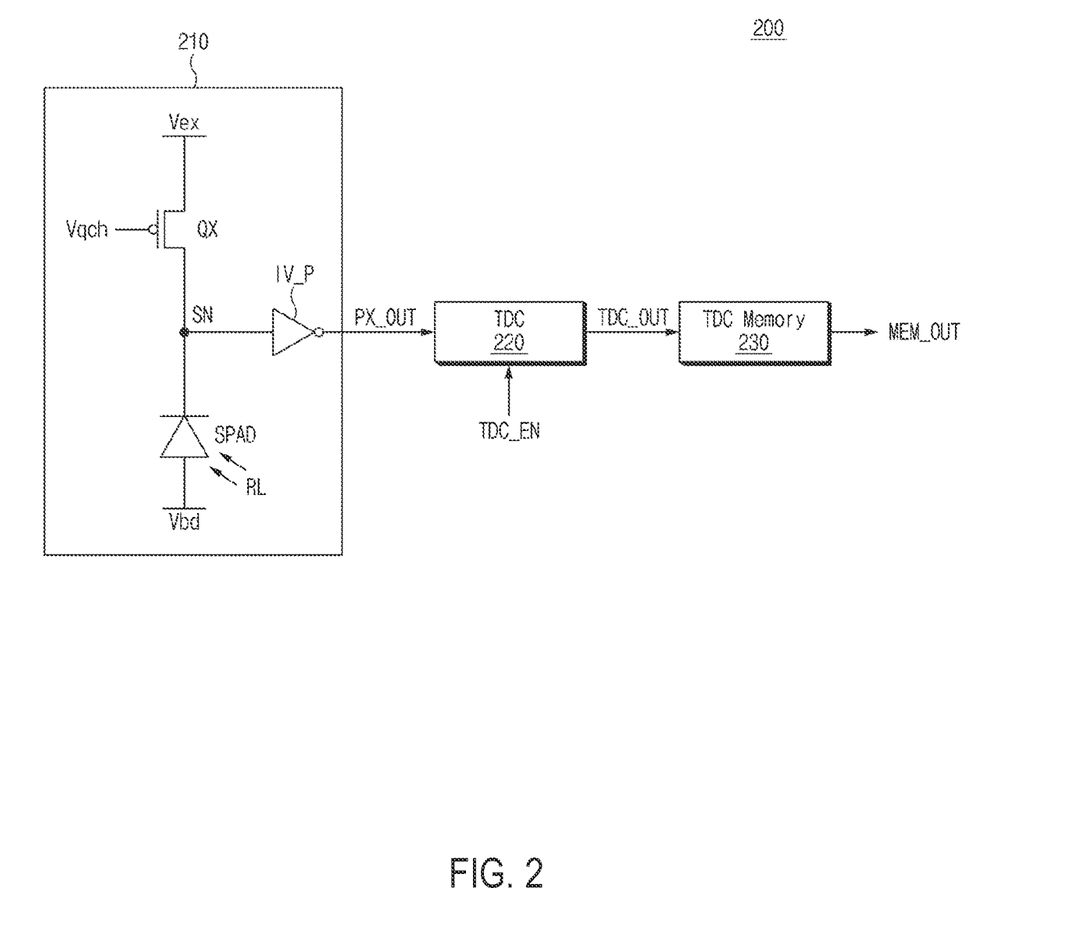
FIG. 2 is a circuit diagram illustrating an example of constituent elements for generating a candidate time-of-flight (TOF) in the image sensing device shown in FIG. 1 based on some implementations of the disclosed technology.

FIG. 2 is a circuit diagram illustrating an example of constituent elements for generating a candidate time-of-flight (TOF) in the image sensing device, shown in FIG. 1, based on some implementations of the disclosed technology.

Referring to FIG. 2, the image sensing device 100 may include constituent elements 200 for generating the candidate time-of-flight (TOF). The constituent elements 200 for generating the candidate time-of-flight (TOF) may include a pixel 210, a time-to-digital converter (TDC) 220, and a TDC memory 230. According to an embodiment, the pixel 210 may be included in the pixel array 110 of FIG. 1, and the TDC 220 and the TDC memory 230 may be included in the readout circuit 130. According to another embodiment, at least one of the TDC 220 and the TDC memory 230 may be included in the pixel array 110.

The pixel 210 may mean substantially the same pixel as the pixel (PX) described in FIG. 1. The pixel 210 may include a single photon avalanche diode (SPAD), a quenching circuit (QX), and a pixel inverter (IV_P).

The SPAD may detect a single photon of the reflected light (RL) reflected by the target object 1 and may generate a voltage pulse corresponding to the detected single photon.

The SPAD may be used as a photodiode including a photosensitive P-N junction. In the SPAD, an avalanche breakdown may be triggered by a single photon received in a Geiger mode that receives a reverse bias voltage at which a cathode-to-anode voltage is higher than a breakdown voltage so that the SPAD may generate voltage pulses. As described above, a process in which avalanche breakdown is triggered by a single photon to generate a voltage pulse will hereinafter be referred to as an avalanche process.

One terminal of the SPAD may receive a first bias voltage ($V_{bd}$) for applying a reverse bias voltage capable of operating the SPAD in the Geiger mode to the SPAD. For example, the first bias voltage ($V_{bd}$) may be a voltage at which a value obtained by subtracting a second bias voltage ($V_{ex}$) from the first bias voltage ($V_{bd}$) becomes a negative voltage having an absolute value higher than the absolute value of the breakdown voltage. The other terminal of the SPAD may be connected to a sensing node (SN), and the SPAD may output a voltage pulse generated by sensing the single photon to the sensing node (SN).

The quenching circuit (QX) may perform a quenching operation in which, after a voltage of the sensing node (SN) is lowered due to generation of voltage pulses generated by an avalanche breakdown, the voltage of the sensing node (SN) returns to a second bias voltage ($V_{ex}$) (or the SPAD returns to the Geiger mode). One terminal of the quenching circuit (QX) may receive a second bias voltage ($V_{ex}$) for applying a reverse bias voltage capable of operating the SPAD in the Geiger mode to the SPAD. For example, the second bias voltage ($V_{ex}$) may be a voltage at which a value obtained by subtracting the second bias voltage ($V_{ex}$) from the first bias voltage ($V_{bd}$) becomes a negative voltage having an absolute value higher than the absolute value of the breakdown voltage. The other terminal of the quenching circuit (QX) may be connected to the sensing node (SN), and when the quenching circuit (QX) is turned on, the voltage of the sensing node (SN) may return to the second bias voltage ($V_{ex}$).

In some implementations, the quenching circuit (QX) may be implemented as a P-channel metal oxide semiconductor (PMOS) transistor that receives a quenching control voltage ($V_{qch}$) through a gate terminal thereof. The quenching control voltage ($V_{qch}$) may have a turn-on voltage when the voltage of the sensing node (SN) is lowered due to the generation of voltage pulses and may have a turn-off voltage when the voltage of the sensing node (SN) returns to the second bias voltage ($V_{ex}$). For example, a quenching control voltage ($V_{gch}$) may be supplied from the sensor driver 120 or may be supplied from the sensing node (SN).

The pixel inverter (IV_P) may sample an analog voltage pulse generated from the sensing node (SN) and may convert the sampled analog voltage pulse into a digital pulse signal (i.e., SPAD pulse) having a waveform opposite to that of the analog voltage pulse. Here, the sampling method may be implemented as a method of converting the voltage pulse into a pulse signal having a logic level of '0' or '1' according to whether the level of the voltage pulse is equal to or higher than a threshold level, but the scope or spirit of the disclosed technology is not limited thereto. The analog voltage pulse generated at the sensing node (SN) may have a waveform that is instantaneously lowered from the second bias voltage ($V_{ex}$) by an avalanche process and then returned to the second bias voltage ($V_{ex}$) by a quenching operation. Accordingly, since the pixel inverter (IV_P) converts the voltage pulse into a digital pulse signal having a waveform opposite to that of the voltage pulse, the pixel inverter (IV_P) may have a waveform in which the pixel signal (PX_OUT) corresponding to an output of the pixel inverter (IV_P) has a logic level of 0, then instantaneously transitions to a logic level of 1 (or a logic high level) when the voltage pulse is generated, and finally returns to a logic level of 0 (or a logic low level).

In some implementations, a pulse of the pixel signal (PX_OUT) generated by the pixel inverter (IV_P) may be referred to as a single photon avalanche diode (SPAD) pulse.

The TDC 220 may calculate a time delay between the SPAD pulse of the pixel signal (PX_OUT) output from the pixel 210 and a reference pulse of the emitted light (EL) and may generate TDC data (TDC_OUT) representing the time delay. In some implementations, the TDC 220 may generate TDC data (TDC_OUT) by performing a counting operation from a time point of the reference pulse to a time point of the SPAD pulse. The TDC 220 may obtain, from the timing controller 140 controlling the light source driver 30, a time point at which the reference pulse of the emitted light (EL)

is generated or may consider a predetermined time point (e.g., a time point located before a predetermined time from a start point of the subframe) to be a generation time point of the reference pulse. The TDC data (TDC_OUT) output by the TDC 220 may represent the above-described candidate time-of-flight (TOF), and in the following description, the TDC data (TDC_OUT) and the candidate time-of-flight (TOF) may be used interchangeably in a similar concept.

The TDC 220 may be activated or deactivated according to a TDC enable signal (TDC_EN) supplied from the timing controller 140.

The TDC enable signal (TDC_EN) may have an activation level (e.g., a logic level of 1) when generating the TDC data (TDC_OUT) for the pixel 210 is required (e.g., during each subframe) and may have a deactivation level (e.g., a logic level of 0) when generating the TDC data (TDC_OUT) for the pixel 210 is not required (e.g., when the storage capacity of the TDC memory 230 is full). The TDC memory 230 may store the TDC data (TDC_OUT) and may output memory output data (MEM_OUT) to the image signal processor 150 in a predetermined unit (e.g., in units of a subframe). A more detailed structure and operation of the TDC memory 230 will be described later with reference to FIG. 4.

Meanwhile, although FIG. 2 has disclosed the embodiment in which the SPAD receives the first bias voltage ($V_{bd}$) through an anode thereof, other implementations are also possible, and it should be noted that the SPAD may also receive the first bias voltage ($V_{bd}$) through a cathode thereof as needed. However, in this case, the voltage level of the first bias voltage ($V_{bd}$) and the voltage level of the second bias voltage ($V_{ex}$) may be determined such that the SPAD may operate in the Geiger mode.

Figure 3:
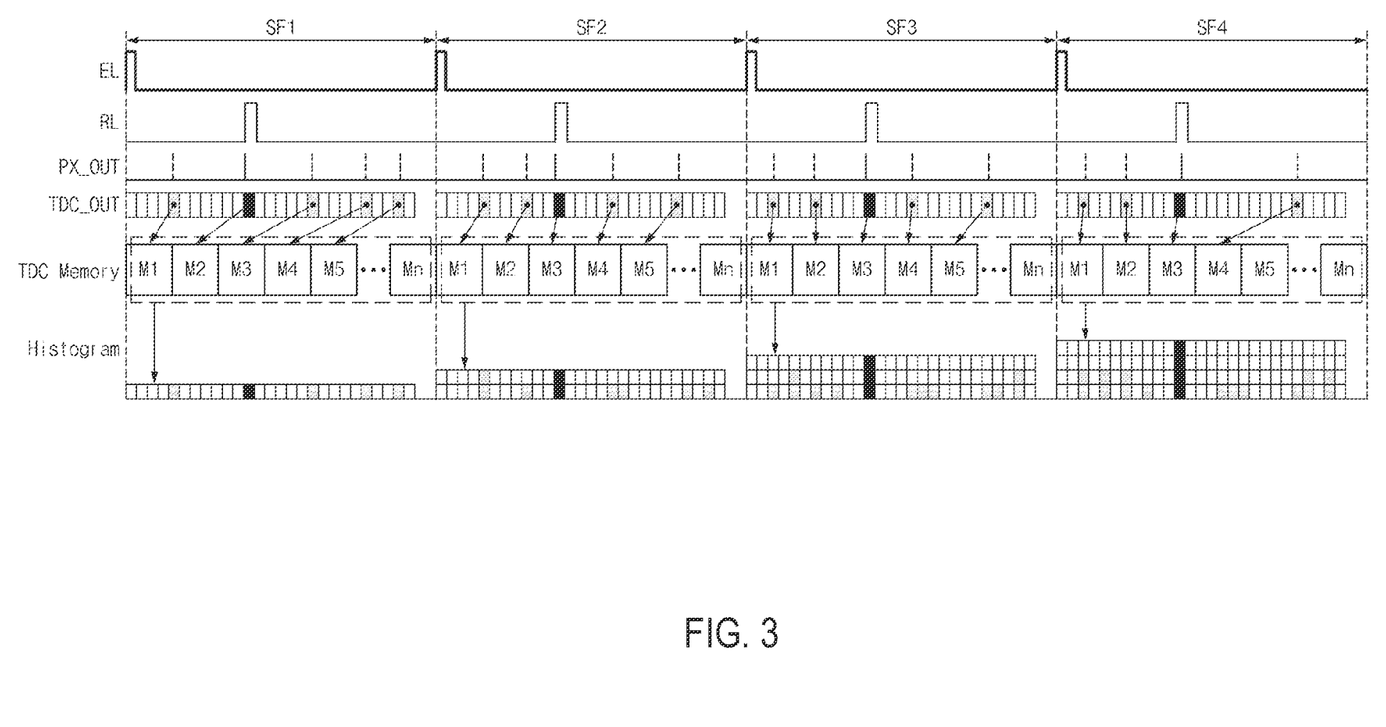
FIG. 3 is a timing diagram illustrating an example operation for generating a candidate time-of-flight (TOF) by the constituent elements shown in FIG. 2 based on some implementations of the disclosed technology.

FIG. 3 is a timing diagram illustrating an example operation for generating a candidate time-of-flight (TOF) by the constituent elements, shown in FIG. 2, based on some implementations of the disclosed technology.

Referring to FIG. 3, a target time-of-flight (TOF) corresponding to the distance to the target object 1 detected by the pixel 210 may be determined based on data acquired within one frame, and in the disclosed technology, it may be assumed that one frame includes four subframes (SF1~SF4) for convenience of description. In other words, in order to more accurately determine the target time-of-flight (TOF), the target time-of-flight (TOF) may be determined through four detection actions rather than one detection action, which may reduce the influence of noise caused by ambient light. In addition, the number of subframes included in one frame may be predetermined to be 2 or more depending on characteristics (e.g., sensing accuracy, sensing speed, sensing environment, etc.) required for the image sensing device 100 or may be changed according to control signals from an external device (e.g., the timing controller 140 or the image signal processor 150). In addition, the number of subframes included in one frame may be limited to a predetermined number of subframes so that a time delay between a pulse of the emitted light (EL) and a pulse of the reflected light (RL) generated when the emitted light (EL) is reflected from the target object 1 may remain unchanged. This is because, when the time delay is changed, the accuracy of detecting the pulse of the reflected light (RL) may be reduced regardless of reduction of the influence of noise caused by the ambient light.

Meanwhile, the image sensing device 100 may detect a plurality of SPAD pulses and may store candidate time-of-flight (TOF) values corresponding to the plurality of SPAD pulses (according to a multi-event scheme), instead of detecting only one SPAD pulse within each of the subframes SF1~SF4 (according to a single event scheme). At this time, the number of unit memories (M1~Mn, where 'n' is an integer of 2 or more) capable of storing TDC data (TDC_OUT) included in the TDC memory 230 may be a maximum number of SPAD pulses capable of storing the candidate time-of-flight (TOF).

First, in a first subframe (SF1), a time delay depending upon the distance between the pixel 210 and the target object 1 may occur between the pulse of the emitted light (EL) and the pulse of the reflected light (RL) reflected from the target object 1.

The pixel 210 may detect a single photon of incident light including the reflected light (RL) to generate a pixel signal (PX_OUT) including a plurality of SPAD pulses. Here, the remaining SPAD pulses (denoted by dotted lines) excluding the second SPAD pulse (denoted by solid lines) generated by the pulses of the reflected light (RL) may correspond to noise components caused by internal and external factors, such as ambient light or the like.

The TDC 220 may calculate each candidate time-of-flight (TOF) (or each time delay) of each of the plurality of SPAD pulses of the pixel signal (PX_OUT) and may generate TDC data (TDC_OUT) including each candidate time-of-flight (TOF).

The TDC memory 230 may include a plurality of unit memories (M1~Mn), each of which may store TDC data (TDC_OUT) representing one candidate time-of-flight (TOF). The plurality of unit memories (M1~Mn) may store candidate time-of-flight (TOF) values of the TDC data (TDC_OUT), respectively. At this time, among the plurality of unit memories (M1~Mn), the first unit memory M1 may store a candidate time-of-flight (TOF) corresponding to a first SPAD pulse, and the second unit memory M2 may store a candidate time-of-flight (TOF) corresponding to a second SPAD pulse. That is, the m-th unit memory Mm (where 'm' is an integer of '$1 \leq m \leq n$') from among the plurality of unit memories (M1~Mn) may store the candidate time-of-flight (TPF) corresponding to the m-th SPAD pulse.

The TDC memory 230 may store candidate time-of-flight (TOF) values corresponding to the SPAD pulses detected in the first subframe SF1 and may transmit, to the image signal processor 150, the candidate time-of-flight (TOF) values corresponding to the SPAD pulses detected in the first subframe SF1 after a lapse of the first subframe SF1.

The image signal processor 150 may convert the candidate time-of-flight (TOF) values corresponding to the SPAD pulses detected in the first subframe SF1 into histogram values and may store the histogram values, as shown in FIG. 3.

Next, in a second subframe SF2, the pixel 210 may detect a single photon of the reflected light (RL) to generate a pixel signal (PX_OUT) including a plurality of SPAD pulses, and the TDC 220 may calculate a candidate time-of-flight (TOF) of each of the plurality of SPAD pulses of the pixel signal (PX_OUT) to generate TDC data (TDC_OUT) including each candidate time-of-flight (TOF).

The TDC memory 230 may store candidate time-of-flight (TOF) values corresponding to the SPAD pulses detected in the second subframe SF1, and may transmit, to the image signal processor 150, the candidate time-of-flight (TOF) values corresponding to the SPAD pulses detected in the second subframe SF2 after a lapse of the second subframe SF2.

The image signal processor 150 may accumulate the candidate time-of-flight (TOF) values corresponding to the SPAD pulses detected in the second subframe SF2 to form a histogram indicating the accumulated values and may store the resultant histogram values, as shown in FIG. 3.

In each of a third subframe SF3 and a fourth subframe SF4, the image sensing device 100 and the image signal processor 150 may perform the same operation as the operation in the second subframe SF2.

After a lapse of the fourth subframe SF4, the image signal processor 150 may obtain a histogram in which candidate TOF values corresponding to the SPAD pulses detected in the first to fourth subframes (SF1~SF4) are accumulated. Then, the image signal processor 150 may determine a target time-of-flight (TOF) corresponding to the pulse of the reflected light (RL) detected by the pixel 210 based on the accumulated histogram.

In some implementations, the candidate time-of-flight (TOF) values corresponding to the SPAD pulses detected in the first to fourth subframes (SF1~SF4) may be allocated to time bins divided into predetermined time units, and a time corresponding to a time bin including the largest number of candidate time-of-flight (TOF) values may be determined to be a target time-of-flight (TOF). For example, in the example of FIG. 3, a time bin may be measured based on the segmented units for TDC data TDC_OUT and the histogram values.

In the example of FIG. 3, the candidate time-of-flight (TOF) corresponding to the SPAD pulse detecting the pulse of the reflected light (RL) may be displayed in black, and the candidate time-of-flight (TOF) corresponding to the SPAD pulse detecting a single photon of the noise component may be shaded. As shown in FIG. 3, a time corresponding to a twelfth time bin including four candidate TOF values may be determined to be a target time-of-flight (TOF).

Figure 4:
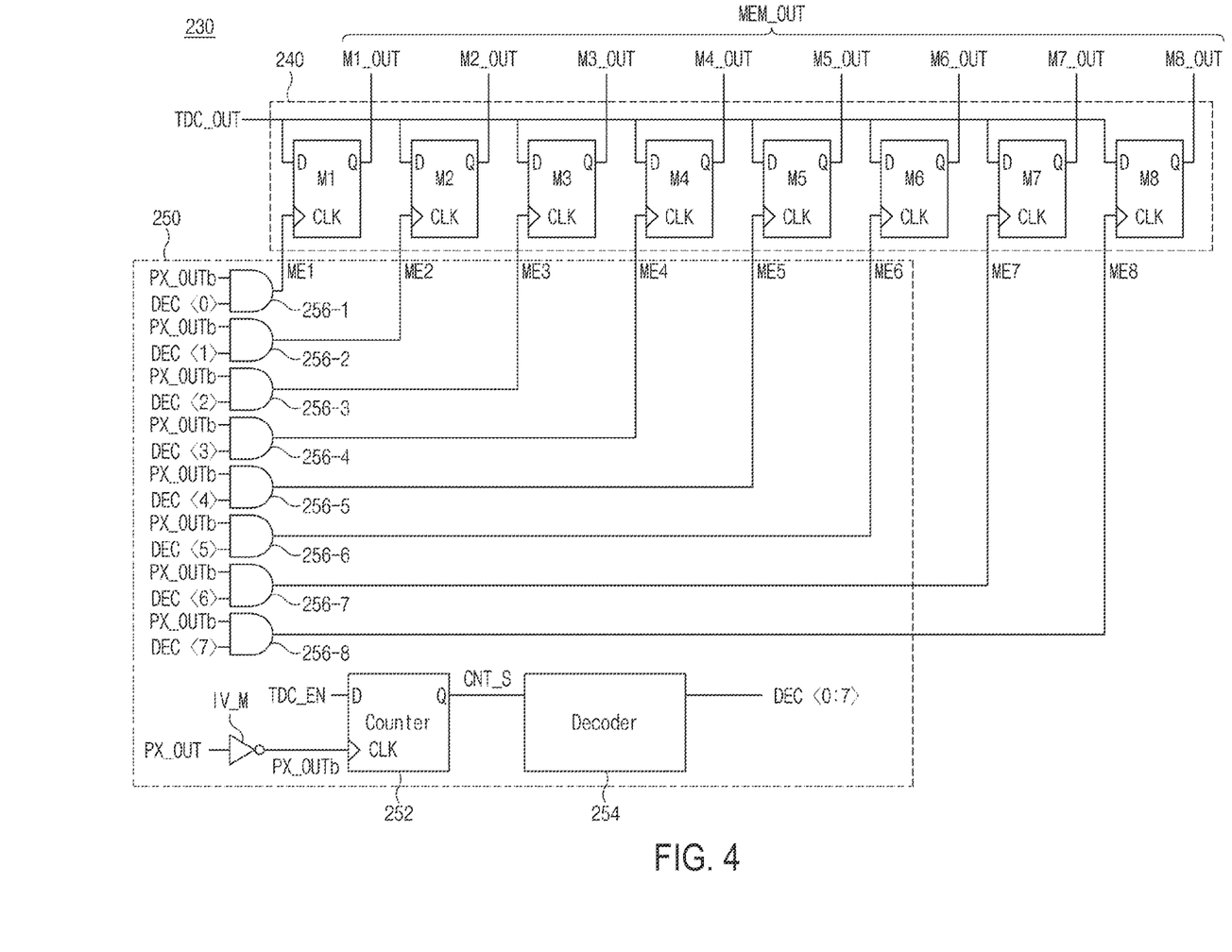
FIG. 4 is a schematic diagram illustrating an example of a time-to-digital converter (TDC) memory shown in FIG. 2 based on some implementations of the disclosed technology.

FIG. 4 is a schematic diagram illustrating an example of the time-to-digital converter (TDC) memory 230, shown in FIG. 2, based on some implementations of the disclosed technology.

Referring to FIG. 4, the TDC memory 230 may include a memory block 240 and a memory control block 250.

The memory block 240 may include first to eighth unit memories (M1~M8). The example of FIG. 4 shows an example case in which the number (n) of unit memories, shown in FIG. 3, is 8 (i.e., n=8).

Each of the first to eighth unit memories (M1~M8) may be implemented as a D flip-flop and may have a storage capacity (e.g., 1 byte) capable of storing TDC data (TDC_OUT) indicating one candidate time-of-flight (TOF).

Each of the first to eighth unit memories (M1~M8) may include a clock enable terminal (CLK), an input terminal (D), and an output terminal (Q). The clock enable terminal (CLK) of each of the first to eighth unit memories (M1~M8) may receive the corresponding memory enable signal (ME1~ME8), the input terminal (D) of each of the first to eighth unit memories (M1~M8) may receive the TDC data (TDC_OUT), and the output terminal (Q) of each of the first to eighth unit memories (M1~M8) may output data currently stored in each of the first to eighth unit memories (M1~M8) as first to eighth memory output data (M1_OUT~M8_OUT). Specifically, the clock enable terminal (CLK) of the first unit memory M1 may receive the memory enable signal ME1, the input terminal (D) of the first unit memory M1 may receive the TDC data (TDC_OUT), and the output terminal (Q) of the first unit memory M1 may output data currently stored in the first unit memory M1 as first memory output data (M1_OUT). The clock enable terminal (CLK) of the second unit memory M2 may receive the memory enable signal ME2, the input terminal (D) of the second unit memory M2 may receive the TDC data (TDC_OUT), and the output terminal (Q) of the second unit memory M2 may output data currently stored in the second unit memory M2 as second memory output data (M2_OUT). The clock enable terminal (CLK) of the third unit memory M3 may receive the memory enable signal ME3, the input terminal (D) of the third unit memory M3 may receive the TDC data (TDC_OUT), and the output terminal (Q) of the third unit memory M3 may output data currently stored in the third unit memory M3 as third memory output data (M3_OUT). The clock enable terminal (CLK) of the fourth unit memory M4 may receive the memory enable signal ME4, the input terminal (D) of the fourth unit memory M4 may receive the TDC data (TDC_OUT), and the output terminal (Q) of the fourth unit memory M4 may output data currently stored in the fourth unit memory M4 as fourth memory output data (M4_OUT). The clock enable terminal (CLK) of the fifth unit memory M5 may receive the memory enable signal ME5, the input terminal (D) of the fifth unit memory M5 may receive the TDC data (TDC_OUT), and the output terminal (Q) of the fifth unit memory M5 may output data currently stored in the fifth unit memory M5 as fifth memory output data (M5_OUT). The clock enable terminal (CLK) of the sixth unit memory M6 may receive the memory enable signal ME6, the input terminal (D) of the sixth unit memory M6 may receive the TDC data (TDC_OUT), and the output terminal (Q) of the sixth unit memory M6 may output data currently stored in the sixth unit memory M6 as sixth memory output data (M6_OUT). The clock enable terminal (CLK) of the seventh unit memory M7 may receive the memory enable signal ME7, the input terminal (D) of the seventh unit memory M7 may receive the TDC data (TDC_OUT), and the output terminal (Q) of the seventh unit memory M7 may output data currently stored in the seventh unit memory M7 as seventh memory output data (M7_OUT). The clock enable terminal (CLK) of the eighth unit memory M8 may receive the memory enable signal ME8, the input terminal (D) of the eighth unit memory M8 may receive the TDC data (TDC_OUT), and the output terminal (Q) of the eighth unit memory M8 may output data currently stored in the eighth unit memory M8 as eighth memory output data (M8_OUT).

Each of the first to eighth unit memories (M1~M8) may store the TDC data (TDC_OUT) received through the input terminal (D) at the rising edge of the corresponding enable signal (ME1~ME8) and may maintain and output the stored TDC data (TDC_OUT).

The memory control block 250 may include a memory inverter (IV_M), a counter 252, a decoder 254, and a plurality of comparators 256-1 to 256-8.

The memory inverter (IV_M) may receive a pixel signal (PX_OUT), invert the pixel signal (PX_OUT), and thus output an inverted pixel signal (PX_OUTb).

The counter 252 may include a clock enable terminal (CLK) for receiving the inverted pixel signal (PX_OUTb), an input terminal (D) for receiving the TDC enable signal (TDC_EN), and an output terminal (Q) for outputting a counter value (CNT_S) currently stored in the counter 252. In the example of FIG. 4, the counter 252 may be implemented as a D flip-flop-based synchronous counter that stores three bits to count numerals up to 8 indicating a maximum number of TDC data (TDC_OUT) that may be stored in the memory block 240.

When the pixel signal PX_OUT has a falling edge, the inverted pixel signal (PX_OUTb) may have a rising edge, and when the TDC enable signal (TDC_EN) has a logic level of 1 at the rising edge of the inverted pixel signal (PX_OUTb), the counter 252 may increase the currently stored counter value (CNT_S) by 1.

The decoder 254 may receive the counter value (CNT_S) and may generate decoder output data (DEC) corresponding to the counter value (CNT_S). In some implementations, the decoder 254 may be implemented as a (P×$2_P$) decoder that receives the counter value (CNT_S) including P bits (where 'P' is an integer of 1 or more) and generates decoder output data (DEC) including $2^P$ bits corresponding to the counter value (CNT_S). In the example of FIG. 4, the decoder 254 may receive a 3-bit counter value (CNT_S) and may generate decoder output data (DEC<0:7>) composed of 8 (=23) bits. One decoder bit from among the first to eighth decoder bits (DEC<0>~DEC<7>) of the decoder output data (DEC<0:7>) may have a logic level of '1' in response to the counter value (CNT_S), and the remaining decoder bits other than the one decoder bit may have the logic level of '0'.

Each of the plurality of comparators 256-1 to 256-8 may compare any one of the first to eighth decoder bits DEC<0> to DEC<7> of the decoder output data DEC<0:7> with the inverted pixel signal (PX_OUTb) and may generate each of the memory enable signals ME1 to ME8. Specifically, the comparator 256-1 may compare the first decoder bit DEC<0> with the inverted pixel signal (PX_OUTb) and may generate the memory enable signal ME1. The comparator 256-2 may compare the second decoder bit DEC<1> with the inverted pixel signal (PX_OUTb) and may generate the memory enable signal ME2. The comparator 256-3 may compare the third decoder bit DEC<2> with the inverted pixel signal (PX_OUTb) and may generate the memory enable signal ME3. The comparator 256-4 may compare the fourth decoder bit DEC<3> with the inverted pixel signal (PX_OUTb) and may generate the memory enable signal ME4. The comparator 256-5 may compare the fifth decoder bit DEC<4> with the inverted pixel signal (PX_OUTb) and may generate the memory enable signal ME5. The comparator 256-6 may compare the sixth decoder bit DEC<5> with the inverted pixel signal (PX_OUTb) and may generate the memory enable signal ME6. The comparator 256-7 may compare the seventh decoder bit DEC<6> with the inverted pixel signal (PX_OUTb) and may generate the memory enable signal ME7. The comparator 256-8 may compare the eighth decoder bit DEC<7> with the inverted pixel signal (PX_OUTb) and may generate the memory enable signal ME8. In some implementations, each of the plurality of comparators 256-1 to 256-8 may be implemented as a logic AND gate. In this case, when any one of the first to eighth decoder bits DEC<0> to DEC<7> of the decoder output data DEC<0:7> and the inverted pixel signal (PX_OUTb) have a logic level of 1, the corresponding memory enable signal (ME1~ME8) may have a logic level of 1. In addition, when any one of the first to eighth decoder bits DEC<0> to DEC<7> of the decoder output data DEC<0:7> and the inverted pixel signal (PX_OUTb) do not have a logic level of '1' (i.e., when at least one of the inverted pixel signal (PX_OUTb) and any one of the first to eighth decoder bits has a logic level of 0), the corresponding memory enable signal (ME1~ME8) may have a logic level of '0'.

Since each of the first to eighth decoder bits DEC<0> to DEC<7> of the decoder output data DEC<0:7> or each of the memory enable signals (ME1~ME8) indicate any one of the plurality of unit memories M1 to M8, the first to eighth decoder bits DEC<0> to DEC<7> and the memory enable signals ME1 to ME8 may be defined as memory addresses as needed.

Figure 5:
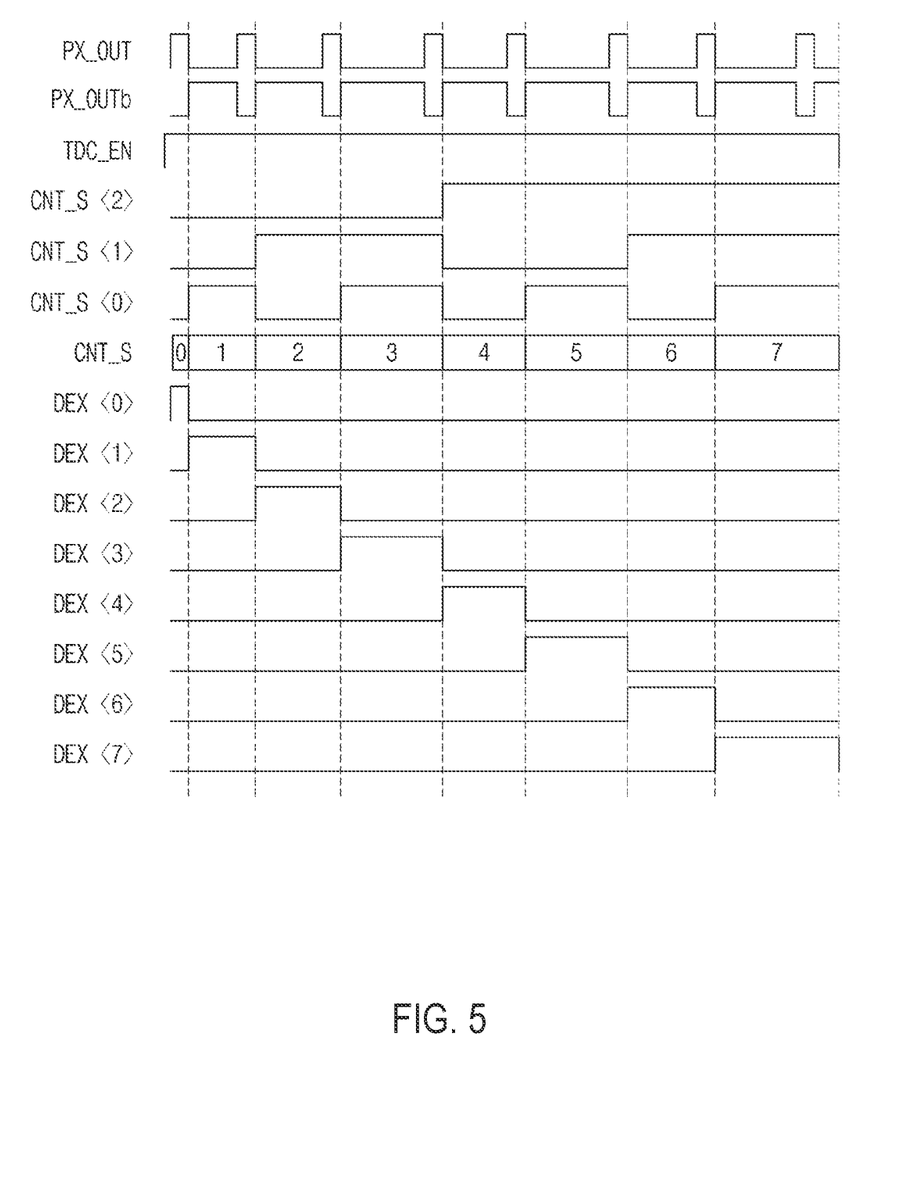
FIG. 5 is a timing diagram illustrating an example operation of the TDC memory shown in FIG. 4 based on some implementations of the disclosed technology.

FIG. 5 is a timing diagram illustrating an example operation of the TDC memory, shown in FIG. 4, based on some implementations of the disclosed technology.

Referring to FIG. 5, it is assumed that the pixel signal (PX_OUT) includes eight SPAD pulses within one subframe, and the inverted pixel signal (PX_OUTb) may have a waveform that is opposite to that of the pixel signal (PX_OUT). In addition, the TDC enable signal (TDC_EN) may maintain a logic level of '1' during the subframe.

The counter value (CNT_S), which is increased by 1 at the rising edge of the inverted pixel signal (PX_OUTb), may include the first to third counter bits CNT_S<0> to CNT_S<2>, the first counter bit (CNT_S<0>) may be a least significant bit (LSB), and the third counter bit (CNT_S<2>) may be a most significant bit (MSB). Therefore, according to the logic levels of the first to third counter bits CNT_S<0> to CNT_S<2>, the counter value (CNT_S) may sequentially represent values from 0 to 7, as shown in FIG. 5.

The first decoder bit (DEC<0>) of the decoder output data (DEC<0:7>) may have a logic level of '1' in response to the counter value (CNT_S) of '0', and the remaining decoder bits other than the first decoder bit (DEC<0>) may have a logic level of '0'.

The second decoder bit (DEC<1>) of the decoder output data (DEC<0:7>) may have a logic level of '1' in response to the counter value (CNT_S) of '1', and the remaining decoder bits other than the second decoder bit (DEC<1>) may have a logic level of '0'.

That is, the (k+1)-th decoder bit (DEC<k>) of the decoder output data (DEC<0:7>) in response to k counter values (CNT_S) (where 'k' is any one of 0 to 7) and the remaining decoder bits other than the the (k+1)-th decoder bit (DEC<k>) may have a logic level of '0'.

The respective memory enable signals (ME1~ME8) may be generated by performing a multiplication operation between the inverted pixel signal (PX_OUTb) and each of the first to eighth decoder bits DEC<0> to DEC<7>. As a result, when TDC data (TDC_OUT) for one pulse of the pixel signal (PX_OUT) is stored in the memory block 240, only one unit memory from among the unit memories (M1~M8) may be activated so that the TDC data (TDC_OUT) may be stored and the remaining unit memories may be deactivated. Therefore, it is possible to significantly reduce a peak current that may occur when the plurality of unit memories (M1~M8) is simultaneously operated, resulting in reduction of power consumption.

Meanwhile, the eighth decoder bit (DEC<7>) of the decoder output data (DEC<0:7>) may be provided to the timing controller 140 and may then transition to a logic level of 1 so that the timing controller 140 may determine that the storage capacity of the TDC memory 230 is full and may allow the TDC enable signal (TDC_EN) to transition to a deactivation level after a lapse of a predetermined time.

As described above, the TDC memory 230 may select any one unit memory from among the plurality of unit memories M1 to M8 according to the number of occurrences of SPAD pulses, activate only the unit memory determined according to the number of occurrences of SPAD pulses, and store TDC data (TDC_OUT).

Figure 6:
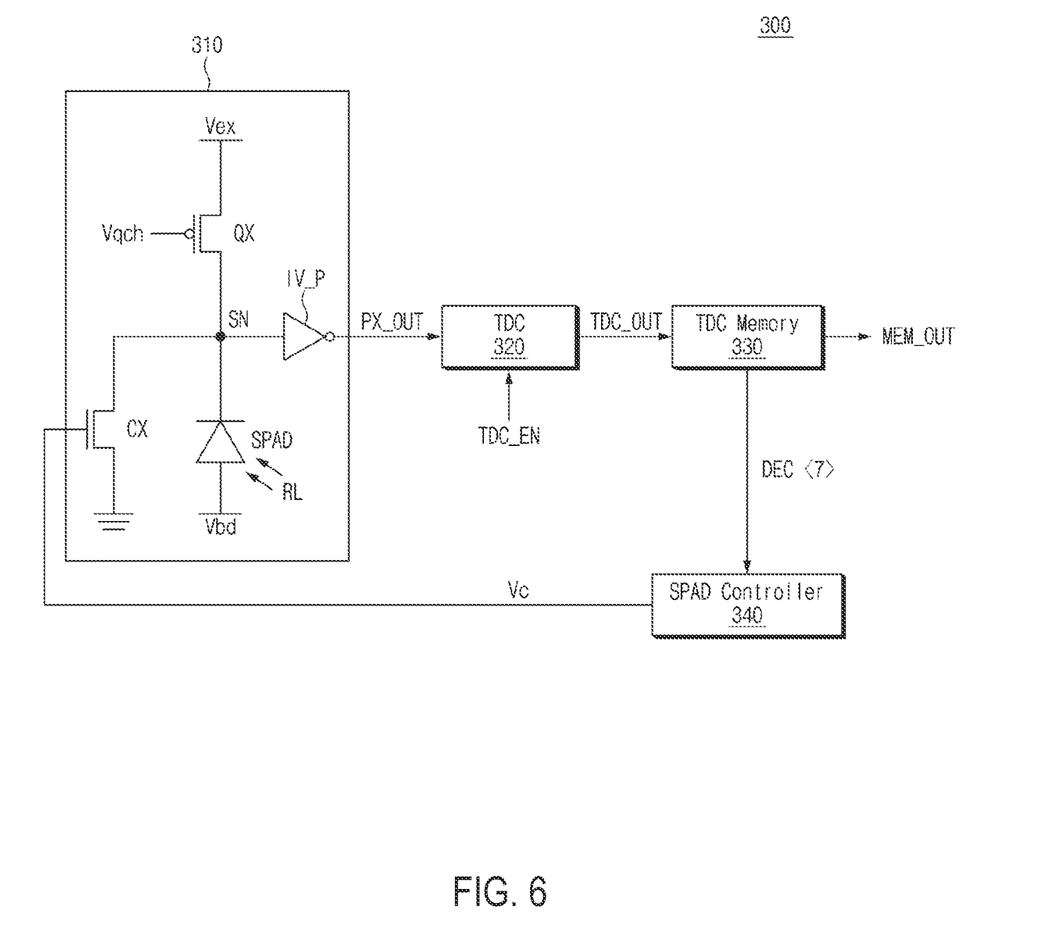
FIG. 6 is a circuit diagram illustrating another example of constituent elements for generating a candidate time-of-flight (TOF) in the image sensing device shown in FIG. 1 based on some implementations of the disclosed technology.

FIG. 6 is a circuit diagram illustrating another example of constituent elements for generating the candidate time-of-flight (TOF) in the image sensing device, shown in FIG. 1, based on some implementations of the disclosed technology.

Referring to FIG. 6, the image sensing device 100 may include constituent elements 200 for generating the candidate time-of-flight (TOF). The constituent elements 200 for generating the candidate time-of-flight (TOF) may include a pixel 310, a time-to-digital converter (TDC) 320, a TDC memory 330, and a single photon avalanche diode (SPAD) controller 340. According to one embodiment, the pixel 310 may be included in the pixel array 110 of FIG. 1, and the TDC 320, the TDC memory 330, and the SPAD controller 340 may be included in the readout circuit 130. According to another embodiment, at least one of the TDC 320, the TDC memory 330, and the SPAD controller 340 may be included in the pixel array 110.

The pixel 310 may mean substantially the same pixel as the pixel (PX), shown in FIG. 1. The pixel 310 may include a SPAD, a quenching circuit (QX), a pixel inverter (IV_P), and a control transistor (CX). That is, the pixel 310 may further include a control transistor (CX) compared to the pixel 210 of FIG. 2, and the remaining components other than the control transistor (CX) may be substantially the same as the structure and operation of the pixel 210 of FIG. 2, and as such, redundant description thereof will herein be omitted for brevity.

The control transistor (CX) may include a gate configured to receive the SPAD control voltage ($V_c$) from the SPAD controller 340 and may be connected between the sensing node (SN) and a ground terminal that supplies a ground voltage (e.g., 0V).

The control transistor (CX) may be turned on in response to the SPAD control voltage ($V_c$) having a logic level of 1 (i.e., a turn-on voltage) so that the sensing node (SN) may be connected to the ground terminal. Since the sensing node (SN) connected to the ground terminal has a ground voltage, the magnitude of the reverse bias voltage applied to the SPAD may be reduced so that the SPAD may operate in a linear mode rather than a Geiger mode. Accordingly, the SPAD might not respond to a single photon so that power consumption caused by the avalanche process of the SPAD might not occur.

In addition, the control transistor (CX) may be turned off in response to the SPAD control voltage ($V_c$) having a logic level of 0 (i.e., a turn-off voltage) so that the sensing node (SN) may be separated from the ground terminal and the SPAD may operate in the same way as the SPAD as shown in FIG. 2.

The structure and operation of the TDC 320 and the TDC memory 330 may be substantially the same as the structure and operation of the TDC 220 and the TDC memory 230 of FIGS. 2 to 5, and as such, redundant description thereof will herein be omitted for brevity.

The SPAD controller 340 may generate the SPAD control voltage ($V_c$) having a logic level of 0 at the beginning of a subframe. Then, as the SPAD controller 340 detects the rising edge of the eighth decoder bit (DEC<7>) received from the TDC memory 330, the logic level of the SPAD control voltage ($V_c$) may transition from 0 to 1, and the SPAD may operate in the linear mode. Thereafter, when the corresponding subframe has ended, the SPAD controller 340 may allow the logic level of the SPAD control voltage ($V_c$) to transition from '1' to '0' so that the sensing node (SN) may be separated from the ground terminal and the quenching control voltage ($V_{qch}$) may have a turn-on voltage. As a result, the sensing node (SN) may have a second bias voltage ($V_{ex}$) so that the SPAD may enter the Geiger mode.

That is, the SPAD controller 340 may generate the SPAD control voltage ($V_c$) based on the number of occurrences of SPAD pulses. More specifically, the SPAD controller 340 may generate the SPAD control voltage ($V_c$) based on the rising edge of the eighth decoder bit (DEC<7>) indicating that the SPAD pulse has occurred to the extent of filling the storage capacity of the TDC memory 330.

Figure 7:
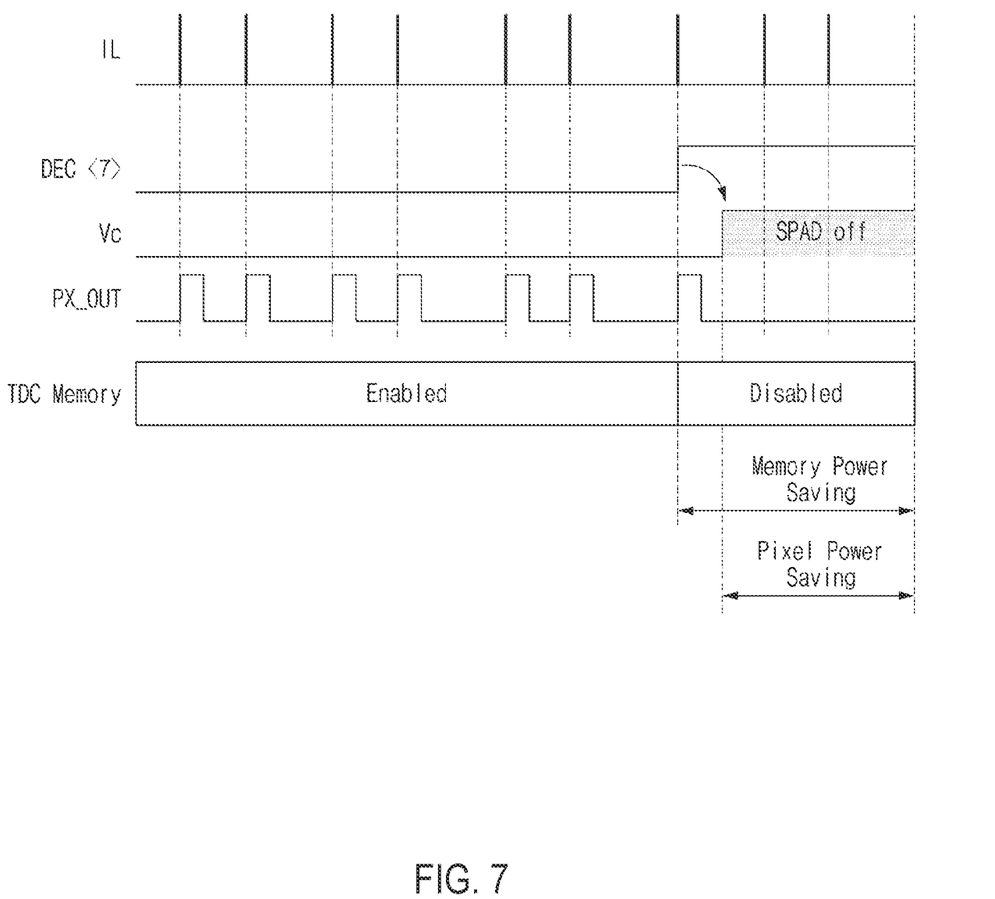
FIG. 7 is a timing diagram illustrating an example operation of a single photon avalanche diode (SPAD) shown in FIG. 6 based on some implementations of the disclosed technology.

FIG. 7 is a timing diagram illustrating an example operation of a single photon avalanche diode (SPAD), shown in FIG. 6, based on some implementations of the disclosed technology.

Referring to FIG. 7, as a single photon (i.e., a portion denoted by a rod) is continuously included in the incident light (IL) within one subframe, the pixel signal (PX_OUT) may continuously generate SPAD pulses.

When the counter value (CNT_S) reaches the value of '7' in a situation in which the TDC memory 330 stores TDC data (TDC_OUT) corresponding to SPAD pulses, the TDC memory 330 may transition the eighth decoder bit (DEC<7>) to a logic level of '1'. Accordingly, the timing controller 140 may transition the TDC enable signal TDC_EN to a deactivation level to deactivate the TDC 320 so that unnecessary power consumption of the TDC 320 and the TDC memory 330 may be prevented (i.e., 'memory power saving' of FIG. 7).

In addition, as the eighth decoder bit (DEC<7>) transitions to a logic level of '1', the SPAD controller 340 may transition the logic level of the SPAD control voltage ($V_c$) from '0' to '1'. By the SPAD control voltage ($V_c$) having the logic level of '1', the SPAD may enter the linear mode so that the SPAD might not react to a single photon of the incident light (IL) (i.e., SPAD off). Accordingly, power consumption caused by the avalanche process of the SPAD in the pixel 310 may be prevented (i.e., 'pixel power saving' of FIG. 7).

The image sensing device 100 according to the embodiments of the disclosed technology may reduce a peak current by minimizing the number of unit memories that operate when TDC data corresponding to the SPAD pulse is stored.

In addition, when the storage capacity of the TDC memory becomes full, the SPAD is turned off so that the amount of power to be consumed in each pixel may be minimized.

The number of subframes per frame, the number of unit memories, the counter value, and the number of bits of decoder output data described in the embodiments of the disclosed technology are merely examples and can be changed within the range to which the technical idea of the disclosed technology can be applied.

As is apparent from the above description, the image sensing device and the imaging device including the same based on some implementations of the disclosed technology can reduce a peak current by minimizing the number of unit memories configured to operate when time-to-digital converter (TDC) data corresponding to a single photon avalanche diode (SPAD) pulse is stored.

The embodiments of the disclosed technology may provide a variety of effects capable of being directly or indirectly recognized through the above-mentioned patent document.

Although a number of illustrative embodiments have been described, it should be understood that modifications and enhancements to the disclosed embodiments and other embodiments can be devised based on what is described and/or illustrated in this patent document.

What is claimed is:

1. An image sensing device comprising:
 a pixel configured to generate a pixel signal having a single photon avalanche diode (SPAD) pulse by detecting incident light;
 a time-to-digital converter (TDC) configured to generate time-to-digital converter (TDC) data representing a time of flight (TOF) for the SPAD pulse; and a TDC memory configured to store the TDC data in a unit memory that is determined from among a plurality of unit memories according to the number of occurrences of the SPAD pulse, wherein the TDC memory further includes a memory control block configured to activate the determined unit memory from among the plurality of unit memories according to the number of occurrences of the SPAD pulse and deactivate remaining unit memories other than the determined unit memory according to the number of occurrences of the SPAD pulse, wherein the memory control block includes:

a memory inverter configured to receive the pixel signal and to generate an inverted pixel signal having a waveform that is opposite to that of the pixel signal;

a counter configured to increase a currently stored counter value at a rising edge of the inverted pixel signal;

a decoder configured to, in response to the counter value, generate decoder output data that includes any one decoder bit having a logic high level and remaining decoder bits each having a logic low level; and a plurality of comparators, each of which compares the inverted pixel signal with each of the decoder bits to generate a memory enable signal.

2. The image sensing device according to claim 1, wherein:

the time of flight (TOF) is a time delay between a reference pulse of emitted light irradiated to a target object and the SPAD pulse.

3. The image sensing device according to claim 2, wherein:

the TDC generates the TDC data by performing a counting operation from a time point at which the reference pulse is generated to a time point at which the SPAD pulse is generated.

4. The image sensing device according to claim 1, wherein:

the decoder is a $(P \times 2^P)$ decoder that receives a counter value including P bits (where 'P' is an integer of 1 or more) and generates decoder output data including $2^P$ bits.

5. The image sensing device according to claim 1, wherein:

each of the plurality of unit memories is activated in response to a rising edge of a corresponding memory enable signal received from a comparator corresponding to each of the plurality of unit memories and stores the TDC data.

6. The image sensing device according to claim 1, wherein:

each of the plurality of unit memories is a D flip-flop that receives a corresponding memory enable signal from a comparator corresponding to each of the plurality of unit memories through a clock terminal thereof.

7. The image sensing device according to claim 1, wherein the pixel includes:

a single photon avalanche diode (SPAD) configured to generate a voltage pulse at a sensing node by detecting a single photon of the incident light in a Geiger mode;

a quenching circuit configured to perform a quenching operation for returning the SPAD to a Geiger mode; and a pixel inverter configured to convert the voltage pulse into the SPAD pulse having a waveform that is opposite to that of the voltage pulse.

8. The image sensing device according to claim 7, wherein one terminal of the SPAD receives a first bias voltage, wherein one terminal of the quenching circuit receives a second bias voltage, and wherein an absolute value of a value obtained by subtracting the second bias voltage from the first bias voltage is greater than an absolute value of a breakdown voltage of the SPAD.

9. The image sensing device according to claim 7, further comprising:

a single photon avalanche diode (SPAD) controller configured to generate a single photon avalanche diode (SPAD) control voltage based on the number of occurrences of the SPAD pulse, wherein the pixel further includes a control transistor configured to supply a ground voltage to the sensing node according to the SPAD control voltage.

10. The image sensing device according to claim 1, further comprising:

a light source driver configured to drive a light source to output emitted light having a predetermined waveform;

a sensor driver configured to drive the pixel; and a timing controller configured to control the sensor driver, the TDC, and the TDC memory.

11. An image sensing device comprising:

a memory block including a plurality of unit memories; and a memory control block configured to control the memory block to store time-to-digital converter (TDC) data representing a time of flight (TOF) for a single photon avalanche diode (SPAD) pulse, the SPAD pulse being stored in a unit memory that is determined from among a plurality of unit memories according to the number of occurrences of the SPAD pulse generated through detection of incident light, wherein the memory control block configured to activate the determined unit memory from among the plurality of unit memories according to the number of occurrences of the SPAD pulse and deactivate remaining unit memories other than the determined unit memory according to the number of occurrences of the SPAD pulse, wherein the memory control block includes:

a memory inverter configured to receive a pixel signal including the SPAD pulse and to generate an inverted pixel signal having a waveform that is opposite to that of the pixel signal;

a counter configured to increase a currently stored counter value at a rising edge of the inverted pixel signal;

a decoder configured to, in response to the counter value, generate decoder output data including any one decoder bit having a logic high level and remaining decoder bits each having a logic low level; and a plurality of comparators, each of which compares the inverted pixel signal with each of the decoder bits to generate a memory enable signal.

12. The image sensing device according to claim 11, wherein:

the decoder is a $(P \times 2^P)$ decoder that receives a counter value including P bits (where 'P' is an integer of 1 or more) and generates decoder output data including $2^P$ bits.

13. The image sensing device according to claim 11, wherein:

each of the plurality of unit memories is activated in response to a rising edge of a corresponding memory enable signal received from a comparator corresponding to each of the plurality of unit memories, and stores the TDC data.

14. An imaging device comprising:
an image sensing device configured to store time-to-digital converter (TDC) data representing a time of flight (TOF) for a single photon avalanche diode (SPAD) pulse, the SPAD pulse being stored in a unit memory that is determined from among a plurality of unit memories according to the number of occurrences of the SPAD pulse generated through detection of incident light;
an image signal processor configured to calculate a distance between a pixel generating the SPAD pulse and a target object based on the TDC data; and
a single photon avalanche diode (SPAD) controller configured to generate a single photon avalanche diode (SPAD) control voltage based on the number of occurrences of the SPAD pulse,
wherein the image sensing device further includes a memory control block configured to activate the determined unit memory from among the plurality of unit memories according to the number of occurrences of the SPAD pulse and deactivate remaining unit memories other than the determined unit memory according to the number of occurrences of the SPAD pulse,
wherein the pixel includes:
a single photon avalanche diode (SPAD) configured to generate a voltage pulse at a sensing node by detecting a single photon of the incident light in a Geiger mode;
a quenching circuit configured to perform a quenching operation for returning the SPAD to a Geiger mode;
a pixel inverter configured to convert the voltage pulse into the SPAD pulse having a waveform that is opposite to that of the voltage pulse; and
a control transistor configured to supply a ground voltage to the sensing node according to the SPAD control voltage.

* * * * *